(12) United States Patent
Henning et al.

(10) Patent No.: US 7,156,419 B2
(45) Date of Patent: Jan. 2, 2007

(54) HYBRID GAS GENERATOR

(75) Inventors: Nils Henning, Rostock (DE); Torsten Berg, Krakow am See (DE); Stefan Köpcke, Güstrow (DE); Gerhard Lindemann, Gelbensande (DE)

(73) Assignee: TRW Airbag Systems GmbH, Schau/Inn (DE)

( * ) Notice: Subject to any disclaimer, the term of this patent is extended or adjusted under 35 U.S.C. 154(b) by 368 days.

(21) Appl. No.: 10/754,272

(22) Filed: Jan. 9, 2004

(65) Prior Publication Data

US 2004/0212183 A1  Oct. 28, 2004

(30) Foreign Application Priority Data

Jan. 10, 2003  (DE)  ............................ 203 00 346 U

(51) Int. Cl.
*B60R 21/26* (2006.01)
(52) U.S. Cl. ........................................ 280/741; 102/530
(58) Field of Classification Search ................ 280/737, 280/741, 736, 742; 102/530, 531
See application file for complete search history.

(56) References Cited

U.S. PATENT DOCUMENTS 3,788,667 A * 1/1974 Vancil ........................ 280/737
6,086,094 A * 7/2000 Stevens et al. ............. 280/741
6,786,507 B1 * 9/2004 Dolling et al. ............. 280/737
6,848,713 B1 * 2/2005 Nakashima et al. ........ 280/741
2003/0042720 A1  3/2003 Dolling et al.
2005/0280251 A1 * 12/2005 Yano et al. ................. 280/736

FOREIGN PATENT DOCUMENTS

DE  19954738  5/2001
DE  20114664  2/2002

* cited by examiner

*Primary Examiner*—Paul N. Dickson
*Assistant Examiner*—Drew J. Brown
(74) *Attorney, Agent, or Firm*—Tarolli, Sundheim, Covell & Tummino LLP

(57) ABSTRACT

A hybrid gas generator for use in an occupant restraint system for vehicles comprises a pressure chamber (10), a combustion chamber (14) delimited by a combustion chamber wall (16) and containing a pyrotechnic charge (12), and a passage element (20) arranged between the pyrotechnic charge and the pressure chamber. For a form-fitting securing of the passage element (20) on the combustion chamber wall (16), the passage element (20) and the combustion chamber wall (16) have at least in part a conical shape. On the side facing the pyrotechnic charge (12), the passage element (20) has a collar (38) which acts as a spacer between the passage element (20) and the pyrotechnic charge (12).

11 Claims, 2 Drawing Sheets

HYBRID GAS GENERATOR

TECHNICAL FIELD

The invention relates to a hybrid gas generator with a pressure chamber, a combustion chamber delimited by a combustion chamber wall and containing a pyrotechnic charge, and with a passage element arranged between the pyrotechnic charge and the pressure chamber.

BACKGROUND OF THE INVENTION

Hybrid gas generators of the above type are known, for example, from German Utility Model DE 201 14 669 U. These hybrid gas generators usually operate with a compressed gas which is situated in the pressure chamber and on flowing out mixes with the hot combustion products of the pyrotechnic charge. The resulting mixed gas then arrives into an element of a vehicle occupant restraint system, for example into a gas bag or into a drive device. The passage element has the task of directing the resulting gas stream of combustion products of the pyrotechnic charge towards the pressure chamber, in order to open it as quickly as possible. Hitherto, such passage elements consist of an insert element which is intended to close off the combustion chamber, and a spacer disc by which a blocking of the insert part with unburned particles of the pyrotechnic charge is to be prevented.

SUMMARY OF THE INVENTION

Although the passages elements which have been described are well tested, there is a desire to use components of this type which are even more favourably priced and able to be installed more quickly, with a comparable tightness. According to the invention, this is made possible in a hybrid gas generator of the type initially mentioned, in that the passage element and the combustion chamber wall have at least in part a conical shape for the form-fitting securing of the passage element on the combustion chamber wall, and the passage element has on the side facing the pyrotechnic charge a collar which acts as a spacer between the passage element and the pyrotechnic charge. Whereas therefore in the prior art a two-part solution is used for the passage element, according to the invention only one component is used for the passage element, which can be constructed more simply and can be installed more easily. Through the tapered seat of the passage opening in the combustion chamber wall, furthermore a distinctly better sealing is achieved by simple means. Therefore, moisture can no longer penetrate from the exterior into the combustion chamber and impair the efficiency of the pyrotechnic charge. In addition, during the installation smaller pressing-in forces can be applied than in the prior art. Finally, through the passage element constructed according to the invention, the guiding of the hot gas stream is also improved, so that penetrations by burning on the inner wall of the combustion chamber in the region of the passage element or spacer element are avoided. As a whole, the solution according to the invention leads to a distinct saving of costs in manufacture and installation of the components for the hybrid gas generator.

Preferably, the collar also lies with a form fit against the combustion chamber wall by a tapered seat, i.e. the collar and the passage element have a conical shape narrowing towards the end wall of the combustion chamber, so that an additional sealing zone exists between the pyrotechnic charge and the pressure chamber, whereby both a further moisture barrier is created and also a rear flowing of the passage element on outflow of the combustion products of the pyrotechnic charge from the combustion chamber is prevented. The passage element can in addition lie against a shoulder formed on the end face of the combustion chamber.

The passage element preferably has passage openings which are in the shape of a ring segment or a kidney-shaped, so that a fluid connection can exist between the combustion chamber and the pressure chamber. In addition, the passage element has a destructible sealing element which closes the passage openings. In this way, the combustion chamber can be sealed particularly well against moisture.

The sealing element can be easily destroyed by the rise in temperature and pressure of the combustion products resulting on ignition of the pyrotechnic charge.

It is particularly preferred if the pressure chamber has a destructible membrane on the side facing the combustion chamber, and the membrane can be torn open by the hot combustion products of the pyrotechnic charge flowing through the passage openings in the direction of the pressure chamber.

In a preferred embodiment, the passage element forms an insert in the end wall of the combustion chamber. It then acts both as closure element for the combustion chamber and also as a nozzle, in order to direct the flow of combustion products of the pyrotechnic charge towards the membrane of the pressure chamber.

Advantageously, the hybrid gas generator is used as a component in a vehicle occupant restraint system.

BRIEF DESCRIPTION OF THE DRAWINGS

Further features and advantages of the invention will be apparent from the following description and from the following drawings, to which reference is made. In the drawings.

DETAILED DESCRIPTION OF THE INVENTION

Figure 1:
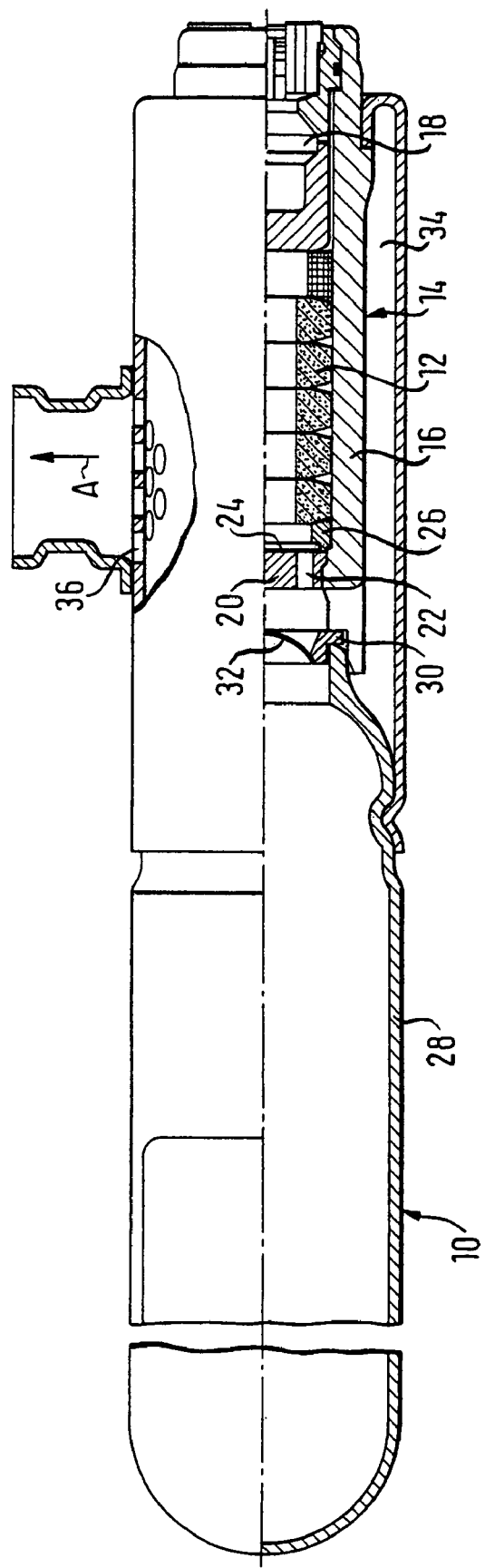
FIG. 1 shows a longitudinal sectional view through a hybrid gas generator according to the prior art.

In FIG. 1 a hybrid gas generator is shown according to the prior art, with an elongated, cylindrical shape. At an axial end there is a pressure chamber 10 filled with compressed gas, and at the opposite end thereto a combustion chamber 14 filled with a pyrotechnic charge 12.

The combustion chamber 14 is delimited by a combustion chamber wall 16. In order to ignite the pyrotechnic charge 12, an igniter 18 is situated on the side of the combustion chamber 14 facing away from the pressure chamber 10. The side of the combustion chamber 14 facing the pressure chamber 10 has a disc-shaped passage element 20 which has passage openings 22 and is provided with a sealing element 24 on the side facing away from the pressure chamber 10. Between the passage element 20 and the pyrotechnic charge 12 there is a spacer element 26.

The pressure chamber 10 has a pressure chamber wall 28, on which on the side of the pressure chamber facing the combustion chamber 14 a holding ring 30 is arranged, which holds a disc-shaped membrane 32. This membrane is very thin-walled and closes the pressure chamber 10 in a pressure-tight manner. Radially outside the combustion chamber 14, an outflow chamber 34 is arranged. The latter has several outlet openings 36, via which released gas can flow in arrow direction A into a gas bag, which is not shown, or into another element of a vehicle occupant restraint system, which is not shown.

Figure 2:
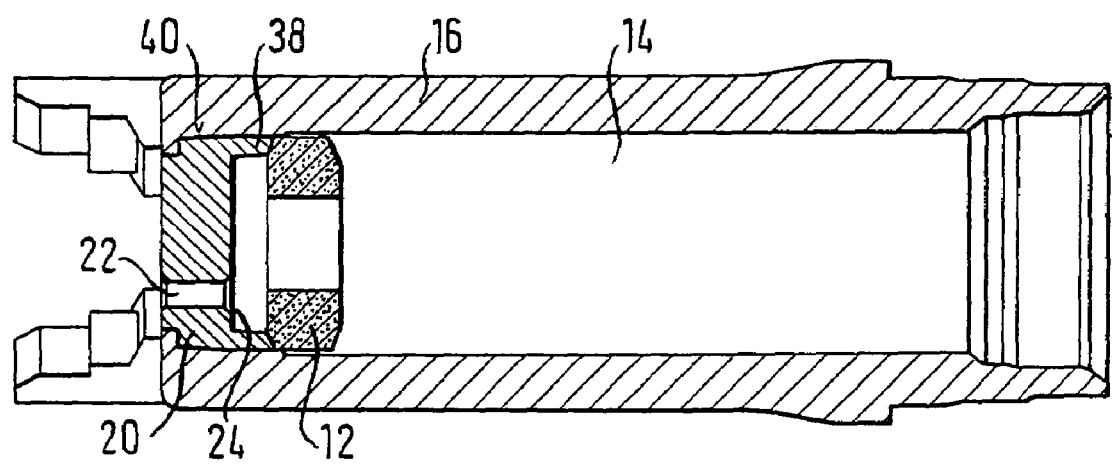
FIG. 2 shows a longitudinal sectional view through a cutout of a hybrid gas generator according to the invention.

In FIG. 2 an embodiment of the invention is shown with the combustion chamber 14 delimited by the combustion chamber wall 16. In the combustion chamber, the pyrotechnic charge 12 (illustrated here only with one hollow cylindrical element) and the passage element 20 are situated. The passage element 20 has passage openings 22 and a collar 38 integrally formed on the passage element 20. The sealing element 24 is applied onto the passage element 20 on the side facing the combustion chamber 14, for example by glueing on. Thereby, a good sealing of the combustion chamber is achieved with respect to the environment, in particular against penetrating moisture. The passage element 20 and preferably also the collar 38 are fitted securely into the combustion chamber wall 16 by a tapered seat 40. For better spacing of the pyrotechnic charge 12 from the passage openings 22, the collar can have extensions directed radially inwards (not illustrated here).

The mode of operation of the hybrid gas generator is to be described briefly below.

After ignition of the pyrotechnic charge 12, the pressure and temperature in the combustion chamber 14 rise to such an extent that the sealing element 24 is destroyed and hot combustion products can emerge via the passage openings 22 in the direction of the membrane 32. The collar 38, which brings about a distance between the pyrotechnic charge 12 and the passage element 20, prevents parts of the pyrotechnic charge from being able to block the passage openings 22. Through the tapered seat 40, it is ensured that the hot combustion products of the pyrotechnic charge emerge solely via the passage openings, but not between combustion chamber wall 16 and passage element 20 in an uncontrolled manner past the latter, from the combustion chamber 14. The collar 38, preferably lying tightly against the combustion chamber wall 16, can further improve the seal between the passage element 20 and the combustion chamber wall 16. The hot combustion products of the pyrotechnic charge, emerging from the passage openings and directed to aim at the thin membrane 32, tear the membrane open, after which the gas stored under high pressure in the pressure chamber 10 emerges from the latter and mixes in the outflow chamber 34 with the hot combustion products of the pyrotechnic charge from the combustion chamber 14. The mixed gas then flows via the outlet openings 36 to the gas bag or to a drive device of a vehicle occupant restraint system.

The invention claimed is:

1. A hybrid gas generator comprising a pressure chamber (10), a combustion chamber (14) delimited by a combustion chamber wall (16) and containing a pyrotechnic charge (12), and a passage element (20) arranged between the pyrotechnic charge and the pressure chamber, wherein for a form-fitting securing of the passage element (20) on the combustion chamber wall (16), the passage element (20) and the combustion chamber wall (16) have at least in part a conical shape, and on the side facing the pyrotechnic charge (12) the passage element (20) has a collar (38) which acts as a spacer between the passage element (20) and the pyrotechnic charge (12).

2. The hybrid gas generator according to claim 1, wherein the collar (38) lies with a form fit against the combustion chamber wall (16).

3. The hybrid gas generator according to claim 1, wherein the passage element (20) has at least one passage opening (22), so that a fluid connection exists between the combustion chamber (14) and the pressure chamber (10).

4. The hybrid gas generator according to claim 3, wherein the passage element (20) has a destructible sealing element (24) which closes the passage opening (22).

5. The hybrid gas generator according to claim 4, wherein the sealing element (24) is adapted for being destroyed by combustion products resulting on ignition of the pyrotechnic charge (12).

6. The hybrid gas generator according to claim 1, wherein the pressure chamber (10) has a destructible membrane (32) on the side facing the combustion chamber (14).

7. The hybrid gas generator according to claim 6, wherein the passage element (20) has at least one passage opening (20), so that a fluid connection exists between the combustion chamber (14) and the pressure chamber (10), the membrane (32) is adapted for being destroyed by the combustion products of the pyrotechnic charge flowing through the passage opening (22) in the direction of the pressure chamber (10).

8. The hybrid gas generator according to claim 1, wherein the passage element (20) forms an insert in an end wall of the combustion chamber (14).

9. The hybrid gas generator according to claim 1, adapted for use in an occupant restraint system for vehicles.

10. A hybrid gas generator comprising a pressure chamber (10), a combustion chamber (14) delimited by a combustion chamber wall (16) and containing a pyrotechnic charge (12), and a passage element (20) arranged between the pyrotechnic charge and the pressure chamber, wherein the passage element (20) abuts against said combustion chamber wall (16) and is form-fitting secured on the combustion chamber wall (16), the passage element (20) and the combustion chamber wall (16) have at least in part a conical shape, and on the side facing the pyrotechnic charge (12) the passage element (20) has a collar (38) which acts as a spacer between the passage element (20) and the pyrotechnic charge (12), wherein said passage element (20) and said collar (38) are one piece.

11. The hybrid gas generator according to claim 10, wherein said passage element (20) and said combustion chamber wall (16) have at least in part a conical shape that narrows towards an end wall of said combustion chamber (14) downstream from said pyrotechnic charge (12).

* * * * *